United States Patent [19]

Moscaret et al.

[11] 3,843,242

[45] Oct. 22, 1974

[54] MOBILE MOTION PICTURE ENTERTAINMENT SYSTEM

[75] Inventors: Eugene J. Moscaret, Arcadia; Thomas C. Soran, West Covina, both of Calif.

[73] Assignee: Bell & Howell Company, Chicago, Ill.

[22] Filed: June 7, 1973

[21] Appl. No.: 367,937

[52] U.S. Cl. .................... 352/132, 248/11, 248/183
[51] Int. Cl. ............................................ G03b 29/00
[58] Field of Search ....... 352/132, 243; 248/11, 183

[56] References Cited
UNITED STATES PATENTS

| | | | |
|---|---|---|---|
| 1,438,790 | 12/1922 | Schwanhauser | 248/11 |
| 1,796,578 | 3/1931 | O'Reilly | 352/132 X |
| 1,854,832 | 4/1932 | Gastonguay | 248/11 |
| 2,002,538 | 5/1935 | Kindelmann | 248/11 |
| 2,066,158 | 12/1936 | Patterson | 352/132 |
| 2,293,207 | 8/1942 | Haskin | 248/183 X |

FOREIGN PATENTS OR APPLICATIONS 207,754    12/1923    Great Britain ...................... 248/11

*Primary Examiner*—Monroe H. Hayes
*Attorney, Agent, or Firm*—Benoit Law Corporation

[57] ABSTRACT

Apparatus for providing motion picture entertainment in a vehicle include a removable motion picture projection unit having supporting wheels. The projection unit is temporarily retained against vehicle movements by a supporting plate structure which is attached to the floor or seat track structure in the vehicle. Fastening devices having mating parts are attached to the projection unit and to the plate structure, respectively, and a mechanism is provided for selectively locking the mating parts together when the projection unit is on the supporting plate.

21 Claims, 9 Drawing Figures

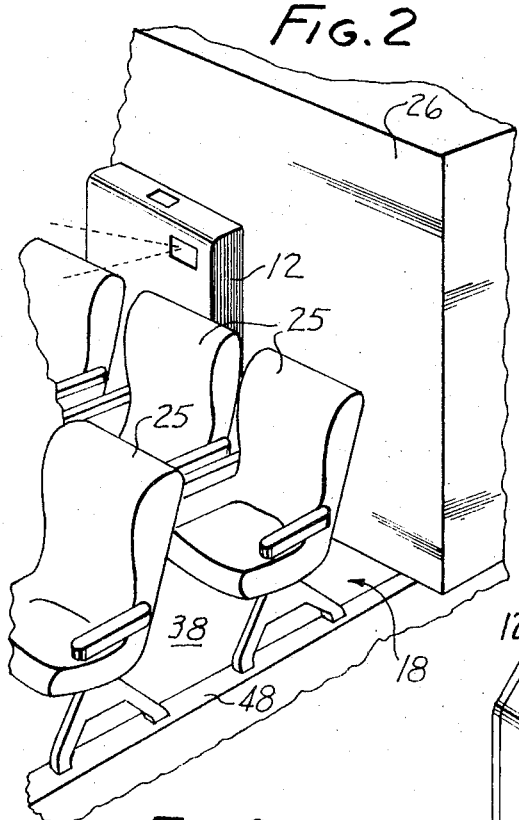
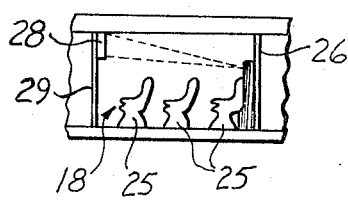
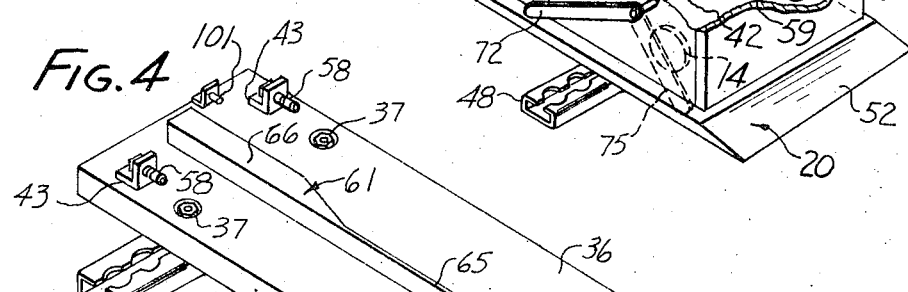
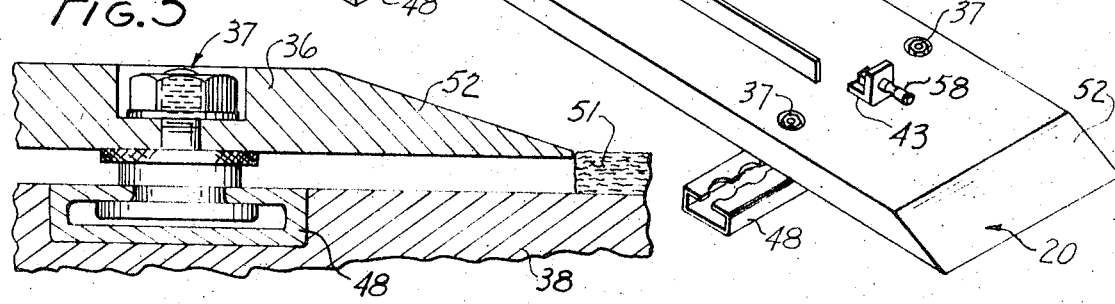

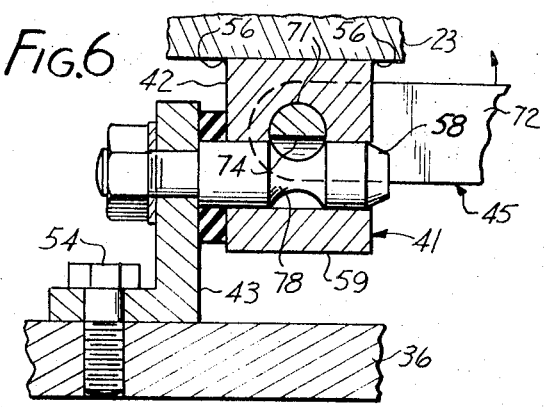
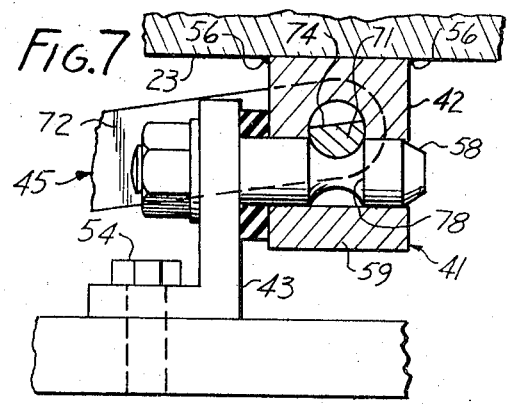
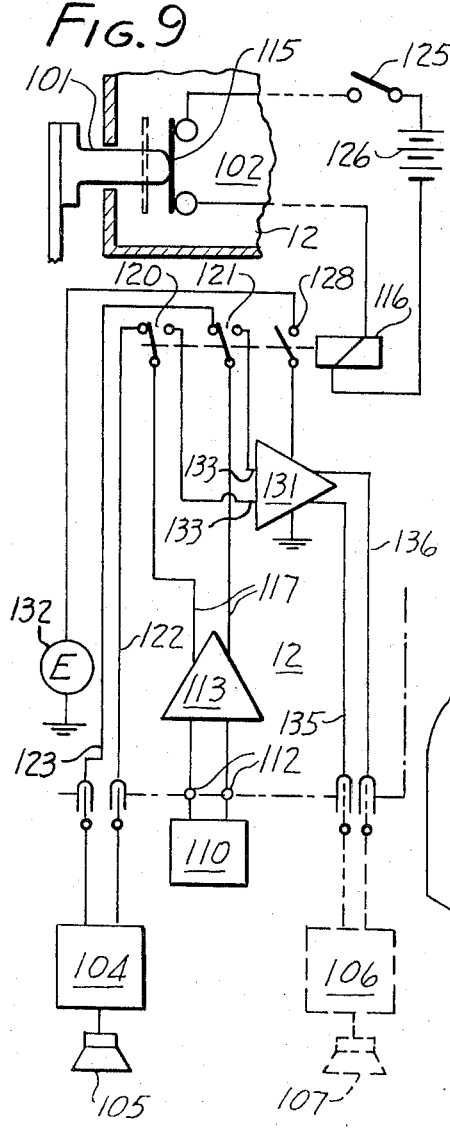
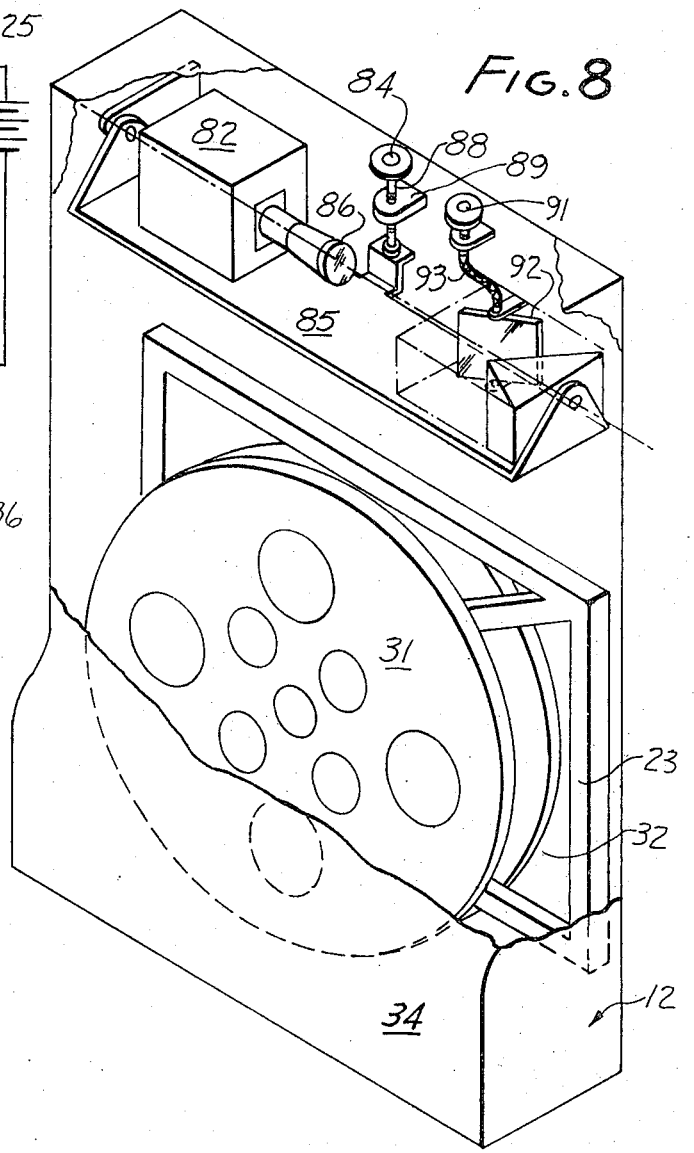

MOBILE MOTION PICTURE ENTERTAINMENT SYSTEM

BACKGROUND OF THE INVENTION

1. Field of the Invention

The subject invention relates to apparatus for providing motion picture entertainment in vehicles and, more particularly, to equipment for temporarily retaining motion picture projection units against vehicle movements in vehicles.

2. Description of the Prior Art

The provision of motion picture entertainment aboard aircraft has become widespread in recent years. Typically, this need has so far been satisfied by designing special motion picture equipment for one or more types of aircraft, and by more or less permanently installing such equipment in selected airplanes.

The great effort and expense connected with this prior-art endeavor has limited the number of aircraft on which motion picture entertainment equipment would be installed and has severely discouraged efforts to work toward exchangeability and adaptability of motion picture entertainment equipment among and to different aircraft.

While the subject disclosure is primarily styled in terms of aircraft, it is readily seen that similar problems occur or would occur in the use of motion picture entertainment equipment in other vehicles, such as buses and railroad or railway cars.

SUMMARY OF THE INVENTION

From one aspect thereof, this invention resides in apparatus for providing motion picture entertainment in a vehicle having a floor structure. The invention according to this aspect resides, more specifically, in the improvement comprising, in combination, a removable motion picture projection unit having supporting wheels for movement of the projection unit in the vehicle, and means for temporarily retaining the projection unit against vehicle movements at a predetermined location inside the vehicle. According to this invention, the latter retaining means include a plate structure for supporting the projection unit, means for attaching the plate structure to the floor structure of the vehicle at the above mentioned predetermined location, fastening means having mating parts, said mating parts including a first fastener part oriented in a direction of motion of said removable projection unit and a second fastener part constructed to mate with said first fastener part, means for attaching the mating first and second fastener parts to the projection unit and to the plate structure, respectively, means for guiding said first and second fastener parts into mutual engagement, including guide means on said plate structure and corresponding guide follower means on said projection unit, and actuable means for selectively locking the mating first and second fastener parts together when the projection unit is on the supporting plate.

The defined supporting plate may be permanently or temporarily attached to the vehicle floor structure, and may serve as a means for alternatively receiving different motion picture projection units. This renders it possible to equip one or more motion picture projection units with film at a service station and to move the equipped projection unit or units to different aircraft for motion picture entertainment as desired. In addition, a projection unit that is in need of repair or extensive adjustment may simply be replaced by another projection unit, and the requisite repair or adjustments can be performed more readily at a ground service station.

From another aspect thereof, this invention resides in apparatus for providing motion picture entertainment in a vehicle having seat tracks and passenger seats on some of the seat tracks. The invention according to this other aspect resides, more specifically, in the improvement comprising, in combination, a removable motion picture projection unit having supporting wheels for movement of the unit in the vehicle, and means for temporarily retaining the unit against vehicle movements at a predetermined location inside the vehicle. The latter retaining means include said seat tracks, a plate structure for supporting the unit, means for attaching the plate structure to the seat tracks at the latter predetermined location, fastening means having mating parts, said mating parts including a first fastener part oriented in a direction of motion of said removable projection unit and a second fastener part constructed to mate with said first fastener part means for attaching the mating first and second fastener parts to the projection unit and to the plate structure, respectively, means for guiding said first and second fastener parts into mutual engagement, including guide means on said plate structure and corresponding guide follower means on said projection unit, and actuable means for selectively locking the mating first and second fastener parts together when the projection unit is on the supporting plate.

The invention according to the latter aspect enhances an advantage which is already present with the invention according to the first-mentioned aspect. Briefly, regulations of the Federal Aviation Agency (FAA) and regulations of corresponding agencies outside the United States of America, require observance of special installation and inspection procedures whenever equipment is attached to part of an aircraft. In the case of prior-art equipment, this has been another factor for discouraging work toward exchangeability of installed equipment among aircraft.

The latter problem is considerably alleviated by the use of the removable motion picture projection unit and attachable supporting plate structure according to the subject invention. For instance, the supporting plate structure may be attached to the aircraft floor structure in the manner required by applicable regulations, while the motion picture projection unit may then be placed on and removed from the installed supporting plate structure without further inspection being required each time.

Moreover, if the supporting plate structure is attached to seat tracks in accordance with the above mentioned other aspect of the subject invention, then it is possible to install and remove the supporting plate structure without the clearance of special and time-consuming inspection and other procedures.

From another aspect thereof, this invention resides in apparatus for providing sound accompanied motion picture entertainment in a first vehicle having first seat tracks and a first electrical sound system, and selectively in a second vehicle having second seat tracks and a second electrical sound system. The invention according to this further aspect resides, more specifically, in the improvement comprising, in combination, a movable motion picture projection unit including supporting wheels for movement of the unit in the vehicles, electrical sound equipment, and actuable means for selectively adapting the sound equipment to the first and second electrical sound systems, means for temporarily retaining the projection unit against vehicle movements inside either of the vehicles, including a plate structure for supporting the projection unit, first attaching means for removably attaching the plate structure to the first seat tracks in the first vehicle, second attaching means for removably attaching the plate structure to the second seat tracks in the second vehicle, fastening means having mating parts, means for attaching the mating parts to the projection unit and to the plate structure, respectively, and actuable means for selectively locking the mating parts together when the projection unit is on the supporting plate, and means attachable to the supporting plate for selectively actuating the adapting means for selectively adapting the sound equipment to the first and second electrical sound systems.

The invention according to the latter aspects provides for further adaptability of the projection unit to different aircraft with different sound systems and lends itself to an automatic adaptation without expenditure of special care or skill by the person placing the unit onto the installed supporting plate structure.

From another aspect thereof, this invention resides in apparatus for providing pictorial entertainment in a vehicle. The invention according to this aspect resides more specifically in the improvement comprising, in combination, a removable pictorial display unit, and means for releasably retaining the pictorial display unit against vehicle movements at a predetermined location inside the vehicle, including a retaining structure for retaining the unit, means for attaching the retaining structure to a part of the vehicle at the predetermined location, fastening means having mating parts, said mating parts including a first fastener part oriented in a direction of motion of said removable projection unit and a second fastener part constructed to mate with said first fastener part means for attaching the mating first and second fastener parts to the unit and to the retaining structure, respectively, means for guiding said first and second fastener parts into mutual engagement, including guide means on said plate structure and corresponding guide follower means on said projection unit, and actuable means for selectively locking the mating first and second fastener parts together when the unit is at the retaining structure.

The subject invention is broadly applicable to different forms of pictorial entertainment, such as motion picture entertainment, still picture or color slide entertainment, or video display entertainment. Accordingly, the pictorial display unit may, for instance, be a motion picture display or projector unit, a still picture or color slide display or projector unit, or a video or television display unit. The pictorial display unit may be provided with supporting wheels for movement of the unit in the vehicle to and from the predetermined location where the unit is to be releasably retained.

While the structure for retaining the pictorial display unit is attached to the vehicle at the vehicle floor in accordance with a preferred embodiment of the subject invention, the retaining structure may, if desired, be attached to another part of the vehicle. For instance, the retaining structure may be attached to a wall portion of the vehicle or to an overhead or ceiling portion, if the pictoral display unit is to be retained relative to a vehicle wall portion or vehicle overhead or ceiling portion.

BRIEF DESCRIPTION OF THE DRAWINGS

The subject invention and its objects will become more readily apparent from the following detailed description of preferred embodiments thereof, illustrated by way of example in the accompanying drawings, in which like reference numerals designate like or functionally equivalent parts, and in which:

FIG. 1 is a perspective view of a motion picture entertainment apparatus in accordance with a preferred embodiment of the subject invention;

FIG. 2 is a perspective view showing a preferred location of the apparatus of FIG. 1 inside a vehicle;

FIG. 3 is a side view, on a reduced scale, of the vehicle part shown in FIG. 2;

FIG. 4 is a perspective view of the supporting plate structure of the apparatus shown in FIG. 1;

FIG. 5 is a section, on an enlarged scale, through a fraction of the supporting plate of FIG. 4, showing an attachment thereof;

FIG. 6 is a section, on an enlarged scale, through fastening means employed in the apparatus of FIG. 1;

FIG. 7 is a section similar to FIG. 6 showing the illustrated fastening means in an interlocked position;

FIG. 8 is a perspective view of part of the inside structure of the apparatus of FIG. 1; and FIG. 9 is a circuit diagram of electrical equipment used in conjunction with the apparatus of FIG. 1 in accordance with a further preferred embodiment of the invention.

DESCRIPTION OF PREFERRED EMBODIMENTS

The motion picture entertainment apparatus 10 shown in the drawings comprises essentially a combination of two main parts. These are a removable motion picture projection unit 12 having supporting wheels 13, 14, 15, and 16 for movement of the unit 12 in the vehicle 18 shown in part in FIGS. 2 and 3, and means 20 for retaining the unit 12 against vehicle movements at a predetermined location inside the vehicle.

As illustrated by way of example for the wheel 13, the wheels 13 to 16 are attached by a swivel joint 22 to a frame structure 23 of the projection unit 12.

As seen in FIGS. 2 and 3, a preferred location for the projection unit 12 is behind the last row of seats 25 ahead of a bulkhead 26 in the vehicle. As seen in FIG. 3, the motion picture projection unit 12 is then able to project motion pictures onto a screen 28 mounted, for instance, on a bulkhead 29, ahead of the group of seats 25.

The wheels 13 to 16 permit movement of the projection unit 12 in the vehicle 18 and to and from the location shown in FIGS. 2 and 3. In practice, the projection unit 12 will also be moved outside the vehicle 18, partly on the wheels 13 to 16 and partly on a conventional transport. It is within the contemplation of preferred embodiments of the subject invention that the projection unit 12 be loaded with motion picture film outside the vehicle 18. To this end, the projection unit 12 is equipped with two large film reels 31 and 32 attached to part of the frame structure 23 of the unit and located inside a projection unit housing 34, as shown in FIG. 8. The reels 31 and 32 are preferably large enough to retain sufficient film for motion picture entertainment between major servicing points of the vehicle 18.

As indicated previously, the vehicle 18 may be an aircraft, a bus or a railroad or railway car. In either case, the removable picture projection unit 12 is temporarily retained against vehicle movements at the predetermined location shown in FIGS. 2 and 3. In accordance with the subject invention, the means 20 for temporarily retaining the unit 12 include a plate structure 36 for supporting the unit 12, fasteners 37 for attaching the plate structure 36 to the floor structure 38 of the vehicle at the desired location, fastening means 41 (see FIGS. 6 and 7) having mating parts 42 and 43 attached, respectively, to the projection unit 12 and to the plate structure 36, and an actuator 45 for selectively locking the mating parts 42 and 43 together when the projection unit 12 is on the supporting plate 36.

In accordance with a preferred embodiment of the subject invention, the vehicle 18 has seat tracks 48 and the plate structure 36 is attached to these seat tracks. The seat tracks 48 are of a conventional type as customarily used in aircraft and other vehicles for mounting and retaining the passenger seats 25.

As seen in FIG. 5, the plate structure attaching devices or fasteners 37 may be of a conventional design as customarily employed for fastening seats to seat tracks; the object being to attach the plate structure 36 removably but firmly to the floor structure 38, including the seat tracks 48, of the vehicle 18.

As seen in FIG. 5, the attached plate structure 36 may be somewhat spaced from the floor structure 38 to accommodate the thickness of a carpet or other floor covering 51 on the vehicle floor. In the illustrated preferred embodiment, the plate structure 36 has a beveled or slanted edge portion 52 for facilitating the wheeling of the projection unit 12 onto and from the plate structure 36.

As seen in FIGS. 6 and 7, the part 43 of the fastening device 41 is attached to the plate structure 36 by threaded bolts, one of which is seen at 54. Other conventional fastening means may, of course, be employed instead of the bolt 54. The part 42 of the fastening device 41 is attached to the frame 23 of the projection unit 12 by welds 56. Other conventional fastening means may, of course, be employed instead of the welds 56.

In accordance with an illustrated preferred embodiment of the invention, each set of mating first and second fastener parts 42 and 43 includes a pin structure 58 oriented in a direction of motion of the projection unit 12 onto and from the plate structure 36, and a socket structure 59 constructed and oriented to mate with or receive the corresponding pin structure.

In accordance with a preferred embodiment of the subject invention, the plate structure 36 has a guide 61 located thereon for guiding the mating fastener parts 42 and 43 or, more exactly, the pin structure 58 and socket structure 59 into mutual engagement.

The guide 61 may be attached to the plate structure 36 by welds, threaded bolts (not shown) or any other suitable fastening means. As shown in dotted outline in FIG. 1, a guide follower means in the form of a pair of wheels or rollers 63 cooperate with the guide 61. These rollers 63 are rotatably mounted on the underside of the frame structure 23 of the projection unit 12.

The guide 61 has a forwardly projecting tongue 65 for roughly guiding the unit 12 to the desired position with the aid of the rollers 63. The guide 61 also has a thicker end-portion 66 for guiding the pair of sockets 59 on one side of the unit 12 exactly into engagement with the corresponding pair of pins 58 at one end of the plate structure 36 as seen in the direction of travel of the unit 12. While the pair of sockets 59 just mentioned is moved onto the corresponding pair of pins 58, the socket 59 located at the opposite side of the unit 12 is moved onto the pin 58 located near the slanted edge 52 of the plate structure 36.

In this manner, the motion picture projection unit 12 is positioned exactly as desired. Before the projection unit 12 is wheeled onto the plate structure 36, the desired position of the projection unit is established by mounting the plate structure 36 at the exact location at which the projection unit 12 is to be situated when the socket structures 59 on the projection unit 12 have fully engaged the pin structures 58 on the plate structure 36.

The projection unit 12 is then locked in position on the plate structure 36. To this end, the previously mentioned actuator 45 has a rod 71 which extends to one of the socket structures 59 and which has a handle 72 attached to one end thereof. While the projection unit 12 is wheeled about, the handle 72 is located in a first position, indicated in dotted outline in FIG. 1. In that position the flat portion 74 of the rod 71 extends in parallel to the inner wall of the socket structure 59, so that the rod 71 does not impede the movement of the socket structure 59 onto and from the pin structure 58 (see FIG. 6).

After the projection unit 12 has been fully positioned on the plate structure 36, the handle 72 is actuated to its position illustrated in solid outline in FIGS. 1 and 7. In that position of the handle 72, the solid portion of the rod 71 below the flat portion 74 is located in a recess 78 of the pin structure 58. This interlocks the pin structure 58 and socket structure 59 with each other. The projection unit 12 is thus safely locked into position on the plate structure 36 against vehicle movements and other external forces. In many cases, the illustrated interlocking of only one set of mating fastener parts will be adequate. However, two or more of the fastener sets 42 and 43 may be interlocked, if desired.

The illustrated projection unit 12 has a conventional control 81 (see FIG. 1) for adjusting the focus of the motion picture projector 82 located in the unit. As seen in FIGS. 1 and 8, the projector unit 12 also has a control 84 for adjusting the pitch of the beam projected by the unit 12. To this end, the projector 82 is mounted on a support 85 which is rotatable relative to an axis near the optical axis of the lens system 86 of the projector 82. The control 84 includes a threaded screw 88 which is rotatably connected to the support 85 and which is threaded in a stationary part 89 of the projection unit so as to tilt the support 85 near the optical axis of the lens system 86 for a correction of the pitch of the projected beam.

In addition, the projection unit 12 has a control 91 by means of which a mirror 92 may be rotated by way of a shaft 93. The mirror 92 is located in the path of the beam projected by the projector 82 and is effective to adjust the yaw of the projected beam upon actuation of the control 91. In this manner, the direction of projection and thus the position of the projected images are adjusted vertically and horizontally.

The controls 84 and 91, and also the control 81, work in cooperation with the selectively attachable and detachable plate structure 36, in that the existence of these controls permit an exchange of the position of the plate structure 36 among several desired locations in the vehicle.

In accordance with a further preferred embodiment of the subject invention, a key 101 or an equivalent means is attached to the plate structure 36 for selectively actuating electrical equipment 102 in the projection unit 12. It will be recognized that this principle is applicable to various types of electrical equipment.

By way of example, and not by way of limitation, the latter aspect of the invention will presently be disclosed in connection with apparatus for providing sound accompanied motion picture entertainment in a first vehicle, such as a first aircraft, having a first electrical sound system, and selectively in a second vehicle, such as a second aircraft, having a second electrical sound system. By way of example, and with reference to FIG. 9, the first electrical sound system may be a system 104 having its own power amplifier for driving loudspeakers 105, while the second electrical sound system may be a system 106 which does not have power amplification for driving its loudspeakers 107.

In accordance with a preferred embodiment under discussion, the movable motion picture projection unit 12 includes sound pickup equipment 110, shown by way of block diagram in FIG. 9. The sound pickup equipment may be of a conventional type including an optical and/or magnetic sound pickup which reproduces sound accompaniments from one or more sound tracks of the motion picture film or from a sound record advancing in synchronism with the motion picture film.

According to FIG. 9, the sound pickup equipment 110 is connected to input terminals 112 of a preamplifier 113 included in the projection unit 12. The amplifier 113 amplifies the sound signal reproduced by the pickup equipment 110.

If the plate structure 36 is mounted in an aircraft or other vehicle which has an electrical sound system of the type of system 104, then the key 101 is omitted from the plate structure. In that case, a switch 115, which would otherwise have been closed by the key 101, remains open after the unit 12 has been positioned on the plate structure 36. Accordingly, a relay 116 in the unit 12 remains in its rest position and the output 117 of the preamplifier 113 is connected to the sound system 104 by way of relay contacts 120 and 121 and leads 122 and 123. In consequence, the sound signals reproduced by the pickup equipment 110 are amplified by the preamplifier 113 in the projection unit 12 and are thereafter amplified by the power amplifier in the sound system 104 of the particular vehicle.

The key 101 is installed on the plate structure 36 when that plate structure 36 is mounted in a vehicle having a sound system of the type shown at 106 in FIG. 9. It will be recalled that the sound system 106 does not have a power amplifier for driving the loudspeakers 107.

in that case, the key 101 closes the normally open switch 115 when the unit 12 is positioned on the plate structure 36. Upon closure of a power switch 125, the relay 116 is energized by an electrical source 126 via the switches 115 and 125.

The energized relay 116 moves the contact blades of the switches 120 and 121 and also of a switch 128 to the right as seen in FIG. 9. The actuated relay switch 128 connects a power amplifier 131 in the projection unit 12 to the internal power system 132 of the vehicle. The power amplifier 131 is thus energized. At the same time, the switches 120 and 121 of the energized relay 116 connect the output 117 of the preamplifier to the input 133 of the power amplifier 131.

Accordingly, the sound signals played back by the pickup equipment 110 are preamplified by the preamplifier 113 and are then amplified by the power amplifier 131. The power-amplified electric sound signals are applied to the sound system 106 by way of leads 135 and 136. No power amplifier is then required in the sound system 106 which then serves primarily for the distribution of the amplified sound signal to the various loudspeakers.

It will be recognized at this juncture that various modifications of the system shown in FIG. 9 are possible. For instance, individual earphones may be employed instead of loudspeakers, as is customary in aircraft entertainment systems. Also, different types of amplifiers may be used in the sound systems 104 and 106.

Other variations and modifications within the spirit and scope of the subject invention will suggest themselves or become apparent to those skilled in the art on the basis of the subject disclosure.

For instance, a plate structure of the type of plate structure 36 may be attached to the wall portion 26 behind the unit 12. In that case, the unit 12 would have the socket structures 59 located at its rear wall for locking engagement with the pin structures 58 on the plate structure 36 then attached to the wall portion 26.

By way of further example, the plate structure 36 may be attached to an overhead or ceiling structure of the vehicle. In that case, a unit of the type of the unit 12, or a video display or television set could be releasably attached to the overhead or ceiling structure.

We claim:

1. In apparatus for providing motion picture entertainment in a vehicle having a floor structure, the improvement comprising in combination:

a removable motion picture projection unit having supporting wheels for movement of said unit in said vehicle; and means for temporarily retaining said unit against vehicle movements at a predetermined location inside the vehicle, including a plate structure for supporting said unit, means for attaching said plate structure to said floor structure at said predetermined location, fastening means having mating parts, said mating parts including a first fastener part oriented in a direction of motion of said removable projection unit and a second fastener part constructed to mate with said first fastener part, means for attaching said mating first and second fastener parts to said projection unit and to said plate structure, respectively, means for guiding said first and second fastener parts into mutual engagement, including guide means on said plate structure and corresponding guide follower means on said projection unit, and actuable means for selectively locking said mating first and second fastener parts together when said projection unit is on said supporting plate.

2. An apparatus as claimed in claim 1, wherein:
said projection unit has means for adjusting the direction of projection vertically and horizontally.

3. In apparatus for providing motion picture entertainment in a vehicle having a floor structure, the improvement comprising in combination:
a removable motion picture projection unit having supporting wheels for movement of said unit in said vehicle; and
means for temporarily retaining said unit against vehicle movements at a predetermined location inside the vehicle, including a plate structure for supporting said unit, means for attaching said plate structure to said floor structure at said predetermined location, fastening means having mating parts, said mating parts including a pin structure oriented in a direction of motion of said projection unit, and a socket structure oriented to receive said pin structure, means for attaching said mating first and second fastener parts to said projection unit and to said plate structure, respectively, said means for attaching said mating parts including means for attaching said pin structure to one of said projection unit and plate structure, and means for attaching said socket structure to the other of said projection unit and plate structure, and actuable means for selectively locking said mating first and second fastener parts together when said projection unit is on said supporting plate, said locking means including means for selectively interlocking said pin structure and socket structure when said projection unit is on said supporting plate.

4. An apparatus as claimed in claim 3, including:
means on said plate structure for guiding said pin structure and said socket structure into mutual engagement.

5. In apparatus for providing motion picture entertainment in a vehicle having a floor structure, the improvement comprising in combination:
a removable motion picture projection unit having supporting wheels for movement of said unit in said vehicle, said projection unit including selectively actuable electrical equipment; and
means for temporarily retaining said unit against vehicle movements at a predetermined location inside the vehicle, including a plate structure for supporting said unit, means for attaching said plate structure to said floor structure at said predetermined location, fastening means having mating parts, said mating parts including a first fastener part oriented in a direction of motion of said removable projection unit and a second fastener part constructed to mate with said first fastener part, means for attaching said mating first and second fastener parts to said projection unit and to said plate structure, respectively, means for guiding said first and second fastener parts into mutual engagement, including guide means on said plate structure and corresponding guide follower means on said projection unit, actuable means for selectively locking said mating first and second fastener parts together when said projection unit is on said supporting plate, and means attached to said plate structure for selectively actuating said electrical equipment.

6. In apparatus for providing motion picture entertainment in a vehicle having seat tracks and passenger seats on some of said seat tracks, the improvement comprising in combination:
a removable motion picture projection unit having supporting wheels for movement of said unit in said vehicle; and
means for temporarily retaining said unit against vehicle movements at a predetermined location inside the vehicle, including said seat tracks, a plate structure for supporting said unit, means for attaching said plate structure to said seat tracks at said predetermined location, fastening means having mating parts, said mating parts including a first fastener part oriented in a direction of motion of said removable projection unit and a second fastener part constructed to mate with said first fastener part, means for attaching said mating first and second fastener parts to said projection unit and to said plate structure, respectively, means for guiding said first and second fastener parts into mutual engagement, including guide means on said plate structure and corresponding guide follower means on said projection unit, and actuable means for selectively locking said mating first and second fastener parts together when said projection unit is on said supporting plate.

7. An apparatus as claimed in claim 6, wherein:
said projection unit has means for adjusting the direction of projection vertically and horizontally.

8. An apparatus as claimed in claim 6, wherein:
said mating parts include a pin structure oriented in a direction of motion of said projection unit, and a socket structure oriented to receive said pin structure;
said means for attaching said mating parts include means for attaching said pin structure to one of said projection unit and plate structure, and means for attaching said socket structure to the other of said projector unit and plate structure; and
said locking means includes means for selectively interlocking said pin structure and socket structure when said projection unit is on said supporting plate.

9. An apparatus as claimed in claim 8, including:
means on said plate structure for guiding said pin structure and said socket structure into mutual engagement.

10. An apparatus as claimed in claim 6, wherein:
said projection unit includes selectively actuable electrical equipment; and
said apparatus includes means attached to said plate structure for selectively actuating said electrical equipment.

11. In apparatus for providing sound accompanied motion picture entertainment in a first vehicle having first seat tracks and a first electrical sound system, and selectively in a second vehicle having second seat tracks and a second electrical sound system, the improvement comprising in combination:
a movable motion picture projection unit including supporting wheels for movement of said unit in said vehicles, electrical sound equipment, and actuable means for selectively adapting said sound equipment to said first and second electrical sound systems;
means for temporarily retaining said unit against vehicle movements inside either of said vehicles, including a plate structure for supporting said unit, first attaching means for removably attaching said plate structure to said first seat tracks in said first vehicle, second attaching means for removably attaching said plate structure to said second seat tracks in said second vehicle, fastening means having mating parts, means for attaching said mating parts to said projection unit and to said plate structure, respectively, and actuable means for selectively locking said mating parts together when said projection unit is on said supporting plate; and means attachable to said supporting plate for selectively actuating said adapting means for selectively adapting said sound equipment to said first and second electrical sound systems.

12. An apparatus as claimed in claim 11, including: means on said plate structure for guiding said mating parts into mutual engagement.

13. An apparatus as claimed in claim 11, wherein: said projection unit has means for adjusting the direction of projection vertically and horizontally.

14. An apparatus as claimed in claim 11, wherein: said mating parts include a pin structure oriented in a direction of motion of said projection unit, and a socket structure oriented to receive said pin structure;
said means for attaching said mating parts include means for attaching said pin structure to one of said projection unit and plate structure, and means for attaching said socket structure to the other of said projection unit and plate structure; and
said locking means includes means for selectively interlocking said pin structure and socket structure when said projection unit is on said supporting plate.

15. An apparatus as claimed in claim 14, including:

means on said plate structure for guiding said pin structure and said socket structure into mutual engagement.

16. In apparatus for providing pictorial entertainment in a vehicle, the improvement comprising in combination:
a removable pictorial display unit; and
means for releasably retaining said pictorial display unit against vehicle movements at a predetermined location inside the vehicle, including a retaining structure for retaining said unit, means for attaching said retaining structure to a part of said vehicle at said predetermined location, fastening means having mating parts, said mating parts including a first fastener part oriented in a direction of motion of said removable projection unit and a second fastener part constructed to mate with said first fastener part, means for attaching said mating first and second fastener parts to said unit and to said retaining structure, respectively, means for guiding said first and second fastener parts into mutual engagement, including guide means on said plate structure and corresponding guide follower means on said projection unit, and actuable means for selectively locking said mating first and second fastener parts together when said unit is at said retaining structure.

17. An apparatus as claimed in claim 16, wherein: said projection unit has means for adjusting the direction of projection vertically and horizontally.

18. An apparatus as claimed in claim 16, wherein: said pictorial display unit has supporting wheels for movement of said unit in said vehicle to and from said predetermined location.

19. In apparatus for providing pictorial entertainment in a vehicle, the improvement comprising in combination:
a removable pictorial display unit; and
means for releasably retaining said pictorial display unit against vehicle movements at a predetermined location inside the vehicle, including a retaining structure for retaining said unit, means for attaching said retaining structure to a part of said vehicle at said predetermined location, fastening means having mating parts, said mating parts including a pin structure oriented in a direction of motion of said projection unit, and a socket structure oriented to receive said pin structure, means for attaching said mating first and second fastener parts to said unit and to said retaining structure, respectively, said means for attaching said mating parts including means for attaching said pin structure to one of said projection unit and retaining structure, and means for attaching said socket structure to the other of said projection unit and retaining structure, and actuable means for selectively locking said mating first and second fastener parts together when said unit is at said retaining structure, said locking means including means for selectively interlocking said pin structure and socket structure when said projection unit is at said retaining plate.

20. An apparatus as claimed in claim 19, including: means on said retaining structure for guiding said mating parts into mutual engagement.

21. In apparatus for providing pictorial entertainment in a vehicle, the improvement comprising in combination:
a removable pictorial display unit, said pictorial display unit including selectively actuable electrical equipment; and
means for releasably retaining said pictorial display unit against vehicle movements at a predetermined location inside the vehicle, including a retaining structure for retaining said unit, means for attaching said retaining structure to a part of said vehicle at said predetermined location, fastening means having mating parts, said mating parts including a first fastener part oriented in a direction of motion of said removable projection unit and a second fastener part constructed to mate with said first fastener part, means for attaching said mating first and second fastener parts to said unit and to said retaining structure, respectively, means for guiding said first and second fastener parts into mutual engagement, including guide means on said plate structure and corresponding guide follower means on said projection unit, actuable means for selectively locking said mating first and second fastener parts together when said unit is at said retaining structure, and means attached to said retaining structure for selectively actuating said electrical equipment.

\* \* \* \* \*